Oct. 2, 1962  J. R. FOSTER  3,056,449
TIRE DEMOUNTING TOOL
Filed July 18, 1960  2 Sheets-Sheet 1

INVENTOR
JAMES R. FOSTER
BY Lowell & Henderson
ATTORNEYS

Oct. 2, 1962  J. R. FOSTER  3,056,449
TIRE DEMOUNTING TOOL
Filed July 18, 1960  2 Sheets-Sheet 2

INVENTOR
JAMES R. FOSTER
BY Lowell + Henderson
ATTORNEYS

United States Patent Office 3,056,449
Patented Oct. 2, 1962

3,056,449
TIRE DEMOUNTING TOOL
James R. Foster, Fort Dodge, Iowa, assignor to The Coats Company, Inc., Fort Dodge, Iowa, a corporation of Iowa
Filed July 18, 1960, Ser. No. 43,521
2 Claims. (Cl. 157—1.22)

This invention relates generally to tire handling apparatus and in particular to a tool for removing the bead of a tire out of engagement with an associated rim flange of a wheel rim.

It is now a usual practice in the mounting and demounting of a tire from a wheel rim to provide a horizontal table support for a tire and wheel assembly, wherein the table has an upright post extended axially upwardly through the wheel assembly. With the assembly supported on the table the tire beads are initially broken away from complementary rim flanges or portions, after which a bead is moved or lifted out of the drop center or rim well to permit removal of the tire from the assembly. This latter operation is usually accomplished by inserting one end of a demounting tool between the tire and bead so that with the tool fulcrumed against the center or upright post, pivotal swinging movement of the tool results in the raising of the bead out of the drop center. However, due to the raising of the bead only at the inserted tool end, the bead has a tendency to fall back into the rim well in a following relation with the tool. The occurrence of such a condition is both aggravating and inconvenient, and results in appreciable loss of time in a tire removing operation.

It is an object of this invention, therefore, to provide an improved tire demounting tool for removing a tire bead from an associated rim flange.

A further object is to provide a tire demounting tool embodying a bead support which is adapted, after a portion of a bead has been removed out of the drop center of the rim, to hold such bead portion against dropping back into the drop center.

Another object of this invention is to provide a tire demounting tool for removing a tire bead from the drop center of an associated rim wherein such removal of the bead and the support of the bead against returning or falling back into the drop center is performed in a single continuous operation.

Further objects, features and advantages of this invention will become apparent from the following description when taken in connection with the accompanying drawing wherein.

Figure 1:
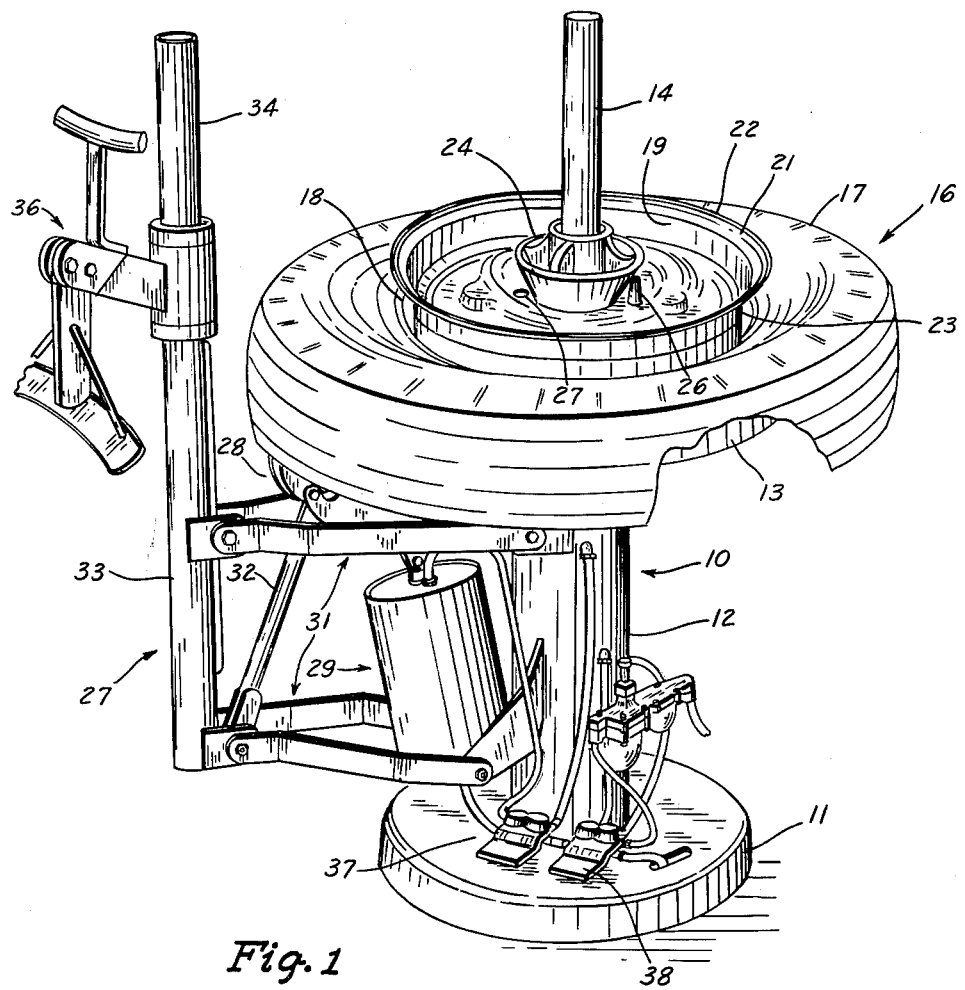
FIG. 1 is a perspective view of a tire handling machine with which the demounting tool of this invention may be used.

With reference to FIG. 1 of the drawing there is illustrated a tire handling machine, indicated generally at 10, and including a base 11 and an upright tubular leg 12 or standard for rotatably supporting a horizontal circular wheel-carrying table 13. Coaxial with the table 13 and projected upwardly from the standard 12 is an upright post 14 which functions to center a tire and wheel assembly, designated generally as 16, on the table 13. The tire 17 of the assembly 16 includes upper and lower beads, only the upper bead 18 being illustrated in FIG. 1, and the wheel 19 includes the usual rim 21 having a pair of rim flanges 22 (only one of which is shown) defining a rim well or drop center 23 therebetween. The table 13 is of a size to receive conventional vehicle wheels for twelve through sixteen inch tires.

The tire and wheel assembly 16 is maintained against movement from a centered position on the table 13 by means including a lockdown or clamping unit 24 operatively associated with the upright post 14, and a holding pin 26 inserted through one of the usual screw openings 27 formed in the wheel 19.

Securely mounted on one side of the standard 12 is a dual action bead breaking assembly 27 which includes generally a lower bead breaking unit 28 (only a portion of which is shown), a double acting pneumatically powered cylinder unit 29, a parallel link unit 31 having a connecting link 32, and an upright support 33 provided adjacent its upper end 34 with a rotatable upper bead breaking unit 36.

Mounted within the standard 12 is a pneumatically powered piston and cylinder unit (not shown) operatively associated with the table 13 so that during the working stroke of the piston the table 13 is rotated in one direction. This machine is fully described in my co-pending application entitled "Tire Handling Machine" filed May 27, 1960, Serial No. 32,289, which matured into Patent Number 3,042,090.

In the breaking of the tire beads away from their associated rim flanges 22, the operation of the bead breaking units 28 and 36 is controlled by a valve unit 37 of foot type operatively associated with the cylinder unit 29 to control the admission and release of air under pressure thereto. With the upper bead breaking unit 36 manually rotated to its position shown in FIG. 1 and on actuation of the control valve 37 the link unit 31 and in turn the lower bead breaking unit 28 are moved upwardly, whereby the lower tire bead (not shown) is engaged by the bead unit 28 and moved away from a complementary portion of its associated rim flange 22, and into the rim drop center or well 23. During this upward movement of the lower bead breaking unit 28, the upper bead breaking unit 36 is also elevated by the action of the link unit 31 and connecting link 32, and their connection with the upright shaft member 33.

To break the upper bead 18 the top bead breaking unit 36 is manually rotated relative to the shaft 33 into a bead engaging position, and is then moved downwardly on actuation of the foot valve 37. As is well known, after a single bead breaking operation a bead may be sufficiently loosened so that the entire bead of the tire can be manually pushed into the rim well 23. However, should this not be possible, the bead breaking operation can be repeated over different parts of the tire 17 by merely actuating the foot valve 38, which controls the operation of the piston and cylinder assembly (not shown) for rotating the table 13.

Figure 2:
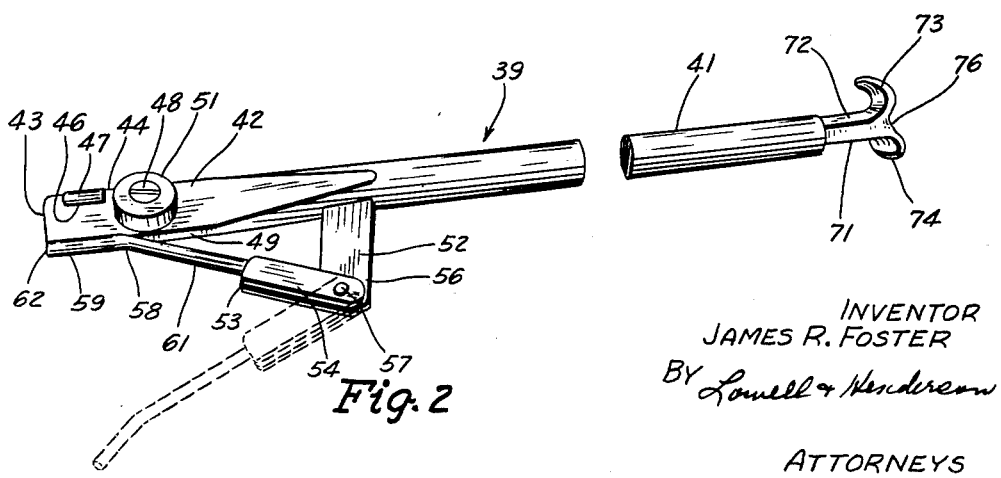
FIG. 2 is a perspective view of the tire demounting tool of this invention.

The tire demounting tool of this invention, designated generally as 39 in FIG. 2, is used to remove the tire beads out of the rim well 23, after they have been broken away from the rim and are within the rim well 23 as illustrated in FIG. 1. This tool 39 includes an elongated cylindrical handle or body member 41 formed with a flat end section 42 of a rectangular shape in transverse section. Adjacent the terminal end 43 of the flat end section 42, and in one side 44 of the end section there is formed a longitudinally extended notch or recess 46 for receiving an elongated bead engaging roller 47 substantially within the dimensional confines of the flat end section 42.

Spaced inwardly from the roller 47 and rotatably supported on a shaft 48, positioned between the sides 44 and 49 of the end section 42 and extended normal to the roller 47, is a second bead engaging roller 51. As shown in FIG. 2 the roller 51 is of a diameter substantially equal to the width or transverse dimension of the flat end section 42.

Carried on the body member 41 at a position inwardly of the flat end section 42 and projected transversely in a direction outwardly from the side 49 of the flat end section 42 is a mounting bracket or arm 52 for a swingable bead supporting unit 53. As illustrated in FIG. 2 the unit 53 has a bifurcated end section 54 arranged in a straddling relation with the free end 56 of the mounting bracket or flat arm 52, to which it is pivotally connected by a pivot 57 extended laterally of the flat end section 42 in a parallel relation with the shaft 48 for the roller 51. The opposite end section 58 of the bead supporting member 53 is of a rod form having a diameter substantially equal to the thickness or lateral dimension of the flat end section 42.

The section 58 is of an angulate shape so as to have relatively inclined portions 59 and 61, and is of a length such that when the bead supporting unit 53 is swung inwardly from its dotted line position shown in FIG. 2 toward the roller 51, the free end portion 59 lies in a back-to-back or parallel relation with the side 49 of the handle flat end section 42 and substantially within the confines of the lateral dimension of the flat end section 42, as shown in full lines in FIG. 2. Also it will be seen that the free terminal end 62 of the bead supporting member 53 is substantially flush with the terminal end 43 of the flat end section 42.

Figure 3:
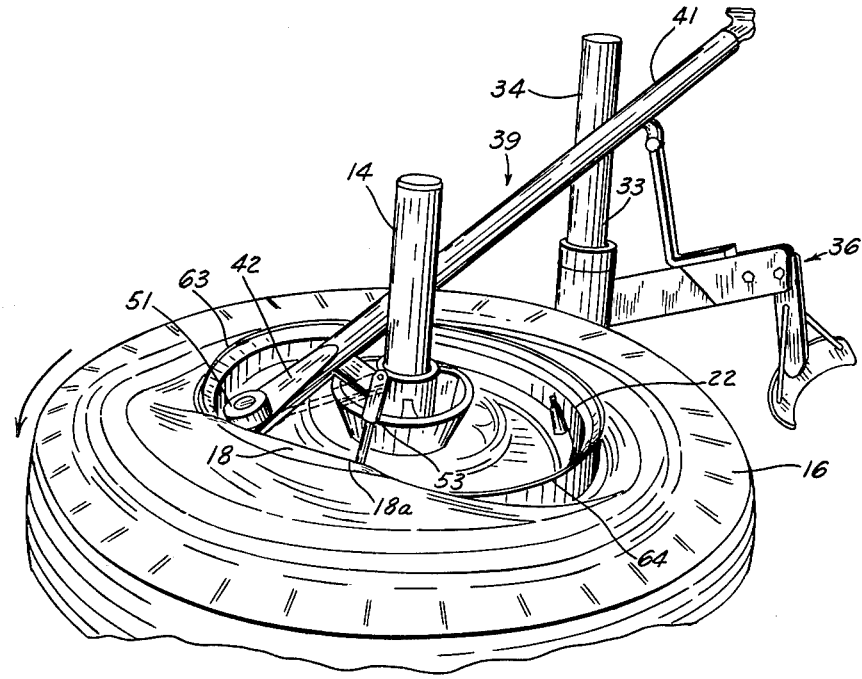
FIG. 3 is a fragmentary perspective view of a tire and wheel assembly supported on the machine of FIG. 1, and showing the tire demounting tool of this invention in operative relation therewith.

In the use of the demounting tool 39 of this invention, assume that the wheel and tire assembly 16 is in a supported position on the table 13 of the machine 10, with the tire beads broken away from the rim flanges 22, as illustrated in FIG. 1. With the bead supporting arm 53 in its full line position shown in FIG. 2, the handle end section 41, remote from the flat end section 42, is manually grasped and manipulated to insert the end section 42 between the rim flange 22 and tire bead 18 to a position defined by the engagement of the roller 51 with a bead 18 (FIG. 3). By using the rim flange 22 as a fulcrum, in a manner well known, and then bearing down on the handle section 41, that portion of the bead 18 extended across the flat section 42 is moved out of the rim well 23 and over the top side 63 of the rim flange 22 to a position out of the well and free of engagement with the inner peripheral side 64 of the rim flange 22, as shown in FIG. 3.

The handle or body member 39, as also shown in FIG. 3, is fulcrumed against one side of the upright post 14 and engaged with the upper end 34 of the shaft 33 so as to be wedged or held fixed between such upright members. On actuation of the foot control valve 38, the table 13 and in turn the tire and wheel assembly 16 are rotated in the direction indicated by the arrow in FIG. 3, whereby the tire bead 18 is rotated relative to the tool 39. As a result of this relative movement the upper bead 18 is progressively moved out of the rim well 23 and over the top side 63 of the rim flange 22 concurrently with the swinging or pivotal movement of the bead supporting unit 53 away from the flat end section 42 of the handle member 39.

As previously mentioned, on initial insertion of the tool end section 42 between the rim flange 22 and the bead 18, a portion of the bead 18 is lifted over the rim flange to a supported position adjacent the roller 51 and on the top of the handle end section 42. The bead portion, indicated as 18a in FIG. 3, first lifted over the rim flange 22 is also supported in part on the unit 53. On rotation of the tire 17 relative to the tool 39, such bead portion 18a remains supported on the unit 53 against movement back into the rim well 23 and functions to retain successively moved portions of the bead 18 out of the rim well 23, by serving as what might be termed a first anchor, with the flat section 42 serving as a second anchor, to provide for the moved section of the bead forming a chord relative to the rim flange 22 as clearly appears in FIG. 3.

This action of the unit 53 to support the bead 18 continues until the terminal end 62 of the unit 53 has been moved out of engagement with the top side 63 of the rim flange 22. However, when such disengagement occurs a sufficient length of the bead 18 has been lifted out of the well 23, in a chord relation with the rim flange 22, to positively prevent slippage of the lifted bead portion back into the well. The remaining portions of the bead may usually be manually moved out of the well. If this manual movement proves difficult it is only necessary to continue with the rotation of the table 13 to move a greater length of the bead 18 out of the well 23.

When the upper bead 18 has been removed from the rim well 23, and out of engagement with its associated rim flange 22, the lower bead (not shown) is brought against the rim flange 22, normally associated with the upper bead 18, and then moved thereover in a manner similar in all respects to the removal of the upper bead 18 from the rim 21.

Where a tire handling machine is used having a stationary table 13 with an upright center post 14, the tool 39 is operated in a manner similar to that just described, except that after the handle member 39 has been fulcrumed against the post 14, the handle section 41 is manually gripped and pulled toward the post to effect a rotational or pivotal movement of the flat end section 42 relative to the wheel assembly 16. During this movement of the tool 39 the bead supporting unit 53 remains stationary and the flat end section 42 is moved away therefrom.

To replace the tire 16 upon the wheel rim 19 the tool 39 (FIG. 2) is provided at its end section 41 with a tire mounting device 71 which includes a shank member 72 secured to and extended axially outwardly from the end section 41 and terminating in a pair of oppositely extended hook members 73 and 74 which are relatively inclined in a direction transversely of the shank 72.

Figure 4:
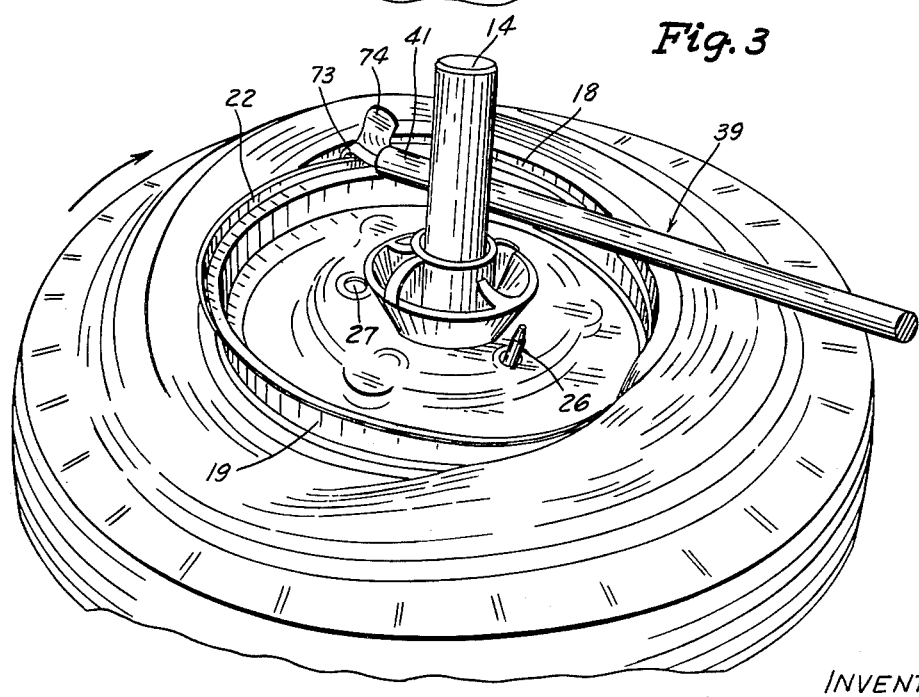
FIG. 4 is a perspective view, illustrated similarly to FIG. 3, and showing an attachment for the tool of this invention for mounting a tire on a wheel.

In use, the hook 73 is extended into hooked engagement with the rim flange 22, as illustrated in FIG. 4, whereby the hook 74 extends upwardly therefrom at an angle so as to be in what might be called a leading relation relative to the hook 73 when the tool end 41 is moved in a clockwise direction as indicated by the arrow in FIG. 4. The concave surface portion, indicated at 76 in FIG. 2, forms an inclined slide for guiding the tire bead 18 from a position above the rim flange 22 into a position below the flange 22 and within the rim well 23. This movement of the bead 18 takes place when the handle 39 is fulcrumed against the upright post 14 and the handle section 41 moved in the direction of the arrow shown in FIG. 4.

Although the upper bead 18 is illustrated in FIG. 4 as being moved into an engaged position with the rim flange 22, it is to be understood that the lower bead of the tire is initially moved into the rim well 23, in the same manner as described above for the upper bead 18.

Although the invention has been described with respect to a preferred embodiment thereof it is to be understood that it is not to be so limited since changes can be made therein which are within the full intended scope of this invention as defined by the appended claims.

I claim:

1. A tool for removing a tire from a wheel and tire assembly supported on a stand having an upright post projected outwardly from the center of said assembly wherein the wheel of said assembly has a rim and the tire of said assembly has bead members, said tool comprising an elongated handle having a flat end section, a lateral projection for engaging a bead member spaced inwardly from the terminal end of said end section, means swingably supported on said handle section about an axis extended in the direction of said projection and including a free end portion movable in the plane of said flat end section to a first position extended in a side by side relation with said flat end section, and to a second position inclined outwardly from said handle with said end portion and end section being of substantially the same thickness, whereby when said end portion, in the first position thereof, is insertable between complementary portions of the wheel rim and a bead member to an extent defined by the engagement of said projection with a bead member, and said handle is fulcrumed against said post, relative movement between the handle and said assembly provides for the progressive positioning of said end portion to the second position therefor so that successive portions of the tire bead engaged by the handle end section are moved over the rim and then retained in said moved position by said end portion.

2. A tool for removing a tire from a wheel and tire assembly supported on a stand having an upright post projected outwardly from the center of said assembly and wherein the wheel of said assembly has a rim and the tire of said assembly a bead, said tool comprising an elongated handle having a flat end section insertable between complementary portions of said bead and rim, means on said end section engageable with a bead to limit the insertion of said end section between said bead and said rim, a projection on said handle spaced from said end section and extended in a direction transversely of said end section, a pivoted bead supporting arm of an angulate shape having a free end section and a pivoted end section, means pivoting the pivoted end section on said projection for pivotal movement of said arm in the plane of said flat end section, said arm being pivotally movable to a first position wherein said free end section is against said flat end section, and extended parallel to said handle, and to a second position wherein said free end section is inclined outwardly from said handle, said free end section and said flat end section being of substantially the same thickness so that when said arm is in the first position therefor, said free end section constitutes a transverse extension of said flat end section for insertion between said rim and said bead whereby, after insertion and with said handle fulcrumed against said post, a relative rotational movement between said handle end section and assembly provides for the raising of said bead over the rim and onto said supporting arm concurrently with a relative swingable movement of said flat end section away from said supporting arm.

References Cited in the file of this patent
UNITED STATES PATENTS

| | | |
|---|---|---|
| 620,836 | Bennett | May 7, 1899 |
| 2,189,683 | Schultz | Feb. 6, 1940 |
| 2,201,982 | Bazarek | May 28, 1940 |
| 2,505,172 | Coats | Apr. 25, 1950 |
| 2,712,350 | Henderson | July 5, 1955 |
| 2,903,050 | Lewis | Sept. 8, 1959 |